Sept. 12, 1939. M. MARASCO 2,172,801

SURFACE-TREATING FILM

Filed June 5, 1936

Fig. 1.

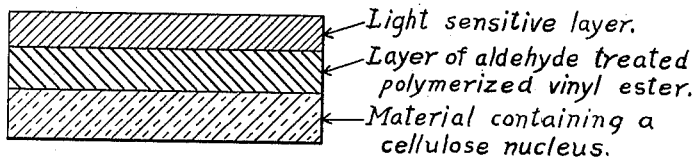

Light sensitive layer.
Layer of aldehyde treated polymerized vinyl ester.
Material containing a cellulose nucleus.

Fig. 2.

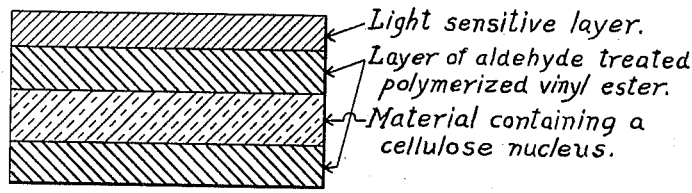

Light sensitive layer.
Layer of aldehyde treated polymerized vinyl ester.
Material containing a cellulose nucleus.

Fig. 3.

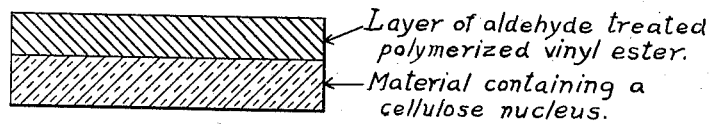

Layer of aldehyde treated polymerized vinyl ester.
Material containing a cellulose nucleus.

INVENTOR.
Martin Marasco.
BY
ATTORNEY

Patented Sept. 12, 1939

2,172,801

UNITED STATES PATENT OFFICE 2,172,801

SURFACE-TREATING FILM

Martin Marasco, Parlin, N. J., assignor to Du Pont Film Manufacturing Corporation, New York, N. Y., a corporation of Delaware Application June 5, 1936, Serial No. 83,764

3 Claims. (Cl. 95—9)

This invention relates to photographic films of improved flexibility and longer life.

Bases or supports of commercial films are usually of a material containing a cellulose nucleus, such as cellulose nitrate or cellulose acetate. Cinematographic films in particular are desired to be extremely flexible and resistant to abrasion. It is furthermore highly desirable that should scratches or abrasions occur on the film it should have a surface that makes them as little noticeable as possible. In passing through various cinematic apparatus, film must be capable of bending in small arcs and of resisting the abrading action of sliding over various guide plates, aperture plates and other frictional surfaces with a minimum of permanent strain from the resulting tensile and compression stresses.

Scratches on the film base not only impair the quality of the projected picture but also add to the objectionable "back-ground" noise when such scratches occur on that portion of the support carrying the sound record. It has also been found that base scratches reduce the tensile strength of the films and thus reduce their effective life. In cinematographic films, and particularly with films used for projection purposes, the life of such films is usually determined by the number of times it will pass through the projector before the perforations begin to crack and tear out. These perforation cracks may also extend in towards the center of the film, increasing in length until the film breaks.

An object of my invention is to provide a film of improved flexibility and longer life. A further object is to provide novel surface-protected layers for the film and for the contact surface of the film base and the emulsion. A still further object is to provide a film which will effectively diminish the harmful effect of film abrasion. Additional and more specific objects will more plainly appear from the detailed description presented herein.

The present invention attains these objects by coating at least one surface of the film with a layer containing a resin formed by the action of aldehydes on hydrolyzed polyvinyl ester or combination of esters, such as described in United States Patent #2,036,092 to Morrison, and particularly those resins which are the more soluble in the solvent mixtures described therein. To these resins I have found that certain hereinafter described solvents, anchoring agents, plasticizers, moistureproofing agents, and other ingredients should be added to attain the widest range of beneficial results.

Methods of casting film and applying layers of material to the films are well-known and need not be described here in detail, but having outlined the principles and objects of the invention, I present in illustration, but not in limitation, the following examples:

COATING SOLUTIONS FOR SURFACE PROTECTION OF FILM BASE

Example I

To a solution comprising 15–30% ethyl alcohol by weight, 4–8% water and 10–20% dioxane, is added 2–10% of a resin resulting from the action of formaldehyde on hydrolyzed polyvinyl acetate. To this is added a solution comprising 20–40% benzol, 5–15% butyl alcohol and 5–15%, by weight, of butyl lactate. This novel solvent mixture affords the preferred bite, anchorage and clarity of coating when applied to nitro-cellulose film base. Instead of butyl lactate, I may use other suitable plasticizers such as dimethyl phthalate, diacetone alcohol, benzyl acetate, cellosolve lactate, glycerol lactate or a combination of these.

Example II

To a solution comprising 60–80% ethyl alcohol, 10–20% water and 5–15% butyl lactate, is added 2–10% of a resin resulting from the interaction of formaldehyde with hydrolyzed polyvinyl propionate. Diluents such as chlorinated or aromatic hydrocarbons may be added to control the bite and coating properties.

Example III

To a solution comprising 60–80% methyl acetate, 5–15% water and 2–8% methyl alcohol, is added 2–10% of a resin resulting from interacting formaldehyde with hydrolyzed polyvinyl acetate and polyvinyl propionate. To this solution is added 5–10% of a high boiler such as butyl lactate.

Example IV

A water-resistant coating can be prepared by adding a wax to these resin solutions. To do this, ½–3% of a wax, such as carnauba or spermaceti, is dissolved in a chlorinated hydrocarbon such as carbon tetrachloride or chloroform or mixtures thereof, or a mixture of carbon tetrachloride or chloroform and methyl or ethyl alcohol, or aromatic hydrocarbons such as benzene or toluol, or mixtures thereof. To a solution comprising 70–90% of the wax solution herein described, are added 5–10% of a high boiling point solvent such as butyl lactate and 2–10% of the resin resulting from interacting formaldehyde with a hydrolyzed polyvinyl ester, such as polyvinyl acetate.

In the attached drawing the figures show various embodiments of the invention. Figure 3 shows a film support of a material containing a cellulose nucleus and superposed thereon a layer of aldehyde treated polymerized vinyl ester. Figure 1 shows this material coated with a light sensitive layer. Figure 2 shows the material of Figure 1 with a layer on the side opposite to the light sensitive layer of aldehyde treated polymerized vinyl ester.

I have also found that alkylated methacrylates, such as described in my co-pending application, Serial Number 79,790, filed May 14, 1936, for example methyl metacrylate or n-propyl-methacrylate, are effective as moistureproofing agents in place of or in addition to the above described waxes.

These novel protective resin layers can also be utilized to carry well-known anti-halation dyes, in which case the water or spirit-soluble dye is simply added to the alcohol-water solution of resin and the other constituents added as described.

The above described surface-protecting solutions may be applied by well-known methods and apparatus to various types of cellulosic film base, such as cellulose acetate and cellulose nitrate. These coatings may be applied to one or both sides of the film base or between the film base and the sensitized emulsion coating. I have found that they not only minimize serious abrasion, but they also reduce surface cracking and prevent the spread of surface cracks once started. When abrasions or scratches appear on my improved surfaces I have found that they have a regular instead of serrated outline. Consequently, this greatly increases the light transmission and reduces the visibility of such abrasions on the film or subsequently on the screen. When used as an intermediate layer between the sensitized emulsion and the base these protective layers have a cushioning effect and check the progress of cracking started in the emulsion surface, as well as the base surface, and consequently impart unusual flexibility and length of life to the finished film.

It is to be understood that while it is preferable to coat the base with the resin solution at some stage during the drying and seasoning operations on the base, yet I consider it to be within the scope of my invention that the hereindescribed resin coating or coatings may be applied at any stage in the manufacture of the film.

The description and examples herein given are intended to be illustrative only. Any modification of or variation therefrom which conforms to the spirit of the invention is intended to be included within the scope of the following claims.

I claim:

1. In combination, a transparent film support of a material containing a cellulose nucleus, a light sensitive layer, and a coating between said layer and said support of a resin formed by the action of an aldehyde on an hydrolized polyvinyl acetate to which has been added a plasticizing agent, an anchoring agent and a water-proofing agent.

2. In combination, a transparent film support of a material containing a cellulose nucleus, a light sensitive layer, and a coating between said layer and said support of a resin formed by the action of an aldehyde on an hydrolized polyvinyl acetate to which has been added a solution comprising 20 to 40% benzol, 5 to 15% butyl alcohol and 5 to 15% by weight of butyl lactate.

3. In combination, a transparent film support of a material containing a cellulose nucleus, a light sensitive layer, and a coating between said layer and said support of a resin formed by the action of an aldehyde on an hydrolized polyvinyl acetate to which has been added butyl lactate and a solution of carnauba wax.

MARTIN MARASCO.